United States Patent
Thirumalai et al.

(10) Patent No.: US 11,546,611 B2
(45) Date of Patent: Jan. 3, 2023

(54) RATE CONTROL FOR FIXED RATE FOVEATED DISPLAY COMPRESSION

(71) Applicant: Samsung Display Co., Ltd., Yongin-si (KR)

(72) Inventors: Vijayaraghavan Thirumalai, Fremont, CA (US); Jalil Kamali, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 40 days.

(21) Appl. No.: 16/290,598

(22) Filed: Mar. 1, 2019

(65) Prior Publication Data

US 2020/0045321 A1    Feb. 6, 2020

Related U.S. Application Data (60) Provisional application No. 62/713,464, filed on Aug. 1, 2018, provisional application No. 62/784,346, filed on Dec. 21, 2018.

(51) Int. Cl.
*H04N 19/172* (2014.01)
*H04N 19/11* (2014.01)
(Continued)

(52) U.S. Cl.
CPC ........... *H04N 19/172* (2014.11); *H04N 19/11* (2014.11); *H04N 19/115* (2014.11);
(Continued)

(58) Field of Classification Search
CPC ..... H04N 19/172; H04N 19/11; H04N 19/119
(Continued)

(56) References Cited

U.S. PATENT DOCUMENTS 10,638,133 B2 *   4/2020   Fang ................... H04N 19/167
2004/0001635 A1   1/2004   Van Der Schaar
(Continued)

OTHER PUBLICATIONS

Vesa: "VDC-M Standard VESA Display Compression-M (VDC-M) Standard", May 11, 2018 (May 11, 2018), XP055518459, https://app.box.com/s/vcocw3z73ta09txiskj7enk6289j356b/folder/49469485945, Retrieved from the Internet: URL:https://vesa.org/vesa-standards/ (Year: 2018).*
(Continued)

*Primary Examiner* — Christopher S Kelley
*Assistant Examiner* — Asmamaw G Tarko
(74) *Attorney, Agent, or Firm* — Lewis Roca Rothgerber Christie LLP (57) ABSTRACT

Provided is a method of coding blocks of video data representing an image using an encoder, the method including identifying, by the encoder, a first region of the image and a second region of the image, a sum of a first number of pixels in the first region and a second number of pixels in the second region being equal to a total number of pixels of the image, and allocating, by the encoder, a first number of bits including base bits for encoding the first region, and a second number of bits including base bits and enhancement bits for encoding the second region, a sum of the first number of bits and the second number of bits being equal to a total number of bits for encoding all of the pixels, wherein the second region is encoded with a greater number of bits per pixel than the first region.

15 Claims, 6 Drawing Sheets

(51) Int. Cl.
*H04N 19/119* (2014.01)
*H04N 19/124* (2014.01)
*H04N 19/33* (2014.01)
*H04N 19/176* (2014.01)
*H04N 21/2343* (2011.01)
*H04N 19/15* (2014.01)
*H04N 21/4728* (2011.01)
*H04N 19/115* (2014.01)
*H04N 19/167* (2014.01)

(52) U.S. Cl.
CPC ......... *H04N 19/119* (2014.11); *H04N 19/124* (2014.11); *H04N 19/15* (2014.11); *H04N 19/167* (2014.11); *H04N 19/176* (2014.11); *H04N 19/33* (2014.11); *H04N 21/234327* (2013.01); *H04N 21/4728* (2013.01)

(58) Field of Classification Search
USPC .......................................................... 375/240
See application file for complete search history.

(56) References Cited

U.S. PATENT DOCUMENTS

| | | |
|---|---|---|
| 2011/0254976 A1 | 10/2011 | Garten |
| 2013/0135437 A1 | 5/2013 | Bruls |
| 2013/0156109 A1 | 6/2013 | Lagrange et al. |
| 2014/0241422 A1* | 8/2014 | Lee ...................... H04N 19/126 375/240.03 |
| 2015/0201191 A1* | 7/2015 | Cheong ................ H04N 19/176 382/166 |
| 2015/0215621 A1* | 7/2015 | Liu ....................... H04N 19/124 375/240.03 |
| 2015/0296209 A1* | 10/2015 | Thirumalai .......... H04N 19/176 375/240.18 |
| 2016/0301939 A1* | 10/2016 | Thirumalai .......... H04N 19/176 |
| 2016/0345022 A1* | 11/2016 | Ju ........................ H04N 19/426 |
| 2017/0150158 A1 | 5/2017 | Jacobson et al. |
| 2017/0223368 A1* | 8/2017 | Abbas ..................... H04N 19/59 |
| 2018/0091819 A1* | 3/2018 | Cook ..................... H04L 1/0014 |
| 2018/0146121 A1* | 5/2018 | Hensler .................... G06T 7/174 |
| 2018/0167634 A1 | 6/2018 | Salmimaa et al. |
| 2018/0310010 A1* | 10/2018 | Hou ........................ H04N 19/34 |
| 2019/0045185 A1* | 2/2019 | Fu ......................... H04N 19/137 |

OTHER PUBLICATIONS

Internet: "VESA Display Comression-M (VDC-M) Standard," VESA: VDC-M Standard, May 11, 2018, 173 pages, XP055518459, http://app.box.com/s/vcocw3z73ta09txiskj7cnk6289j356b/folder/49469485945, Retrieved from the Internet: URL:http://vesa.org/vesa-standards/.

EPO Extended Search Report dated Jan. 2, 2020, for corresponding European Patent Application No. 19189232.2 (10 pages).

* cited by examiner

RATE CONTROL FOR FIXED RATE FOVEATED DISPLAY COMPRESSION

CROSS-REFERENCE TO RELATED APPLICATION(S)

This patent application claims priority to, and the benefit of, U.S. provisional patent application No. 62/713,464 entitled RATE CONTROL FOR FIXED RATE FOVEATED DISPLAY COMPRESSION, filed on Aug. 1, 2018, and U.S. provisional patent application No. 62/784,346 entitled RATE CONTROL FOR FIXED RATE FOVEATED DISPLAY COMPRESSION, filed on Dec. 21, 2018.

FIELD

One or more aspects of embodiments of the present disclosure relate generally display compression, and may also relate to multiresolution virtual reality (VR) compression and VDC-M rate control.

BACKGROUND

As display technology has improved, resolution of the data used for producing an image on the display has markedly improved. Due to continued increase in pixel bandwidth associated with display technology, especially for mobile displays and virtual reality (VR) displays, VESA (Video Electronics Standard Association) has issued a Call for Technologies (CfT) for a display stream codec that supports higher compression rates while allowing for increased computational complexity with respect to display stream compression (DSC).

Display compression enables the transmission of larger resolution data over existing display link bandwidth (e.g., DSC and VDC-M, which are standardized by VESA).

VESA has developed a new display interface compression standard for mobile/smartphone displays, called VESA Display Codec for Mobile (VDC-M). As a new display compression standard, VDC-M targets higher compression ratios than the Display Stream Compression standard (DSC), while still maintaining visually lossless quality, at the cost of increased complexity.

In comparison with image/video compression standards (e.g., JPEG 2000 and HEVC standards), display compression coders/encoders (e.g., DSC, VDC-M) are generally lightweight, and may deliver visually lossless performance. DSC and VDC-M are fixed rate coders, and may respectively support compression rates down to 8 and 6 bits/pixels for a 24 bit color source. For example, VDC-M is fixed rate display stream codec, and therefore has a fixed bitrate, and may support compression rates down to 6 bits/pixel for a RGB 4:4:4 source. VDC-M is a block-based codec with a block size of 8×2 pixels.

The field of view (FOV) for a VR headset may be, for example, about 150 and 135 degrees horizontally and vertically, respectively. However, due to inherent characteristics of the human eye, human perception is not uniform across the entire FOV of 150×135 degrees.

For example, a small depression in the retina of the human eye where visual acuity is highest is referred to as the fovea. The center of the FOV of the human eye is focused in this region, as this is a location where retinal cones are particularly concentrated. Accordingly, the area in which human perception is, best (e.g., has a highest resolution) corresponds to an area that is covered by the fovea. The FOV corresponding to the fovea may be about +/−3 degrees.

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

Embodiments described herein provide improvements to display technology generally, including improvements to display stream compression, which may in turn improve virtual reality (VR) technology.

According to one embodiment of the present disclosure, there is provided a method of coding blocks of video data representing an image using an encoder, the method including identifying, by the encoder, a first region of the image and a second region of the image, a sum of a first number of pixels in the first region and a second number of pixels in the second region being equal to a total number of pixels of the image, and allocating, by the encoder, a first number of bits including base bits for encoding the first region, and a second number of bits including base bits and enhancement bits for encoding the second region, a sum of the first number of bits and the second number of bits being equal to a total number of bits for encoding all of the pixels, wherein the second region is encoded with a greater number of bits per pixel than the first region.

The second region may include a high-resolution region that corresponds to a fixation point of a user viewing the image on a display, wherein the first region includes a low-resolution region that is outside the fixation point.

The method may further include identifying, by the encoder, a third region of the image, wherein the third region is encoded with a greater number of bits per pixel than the first region, and is encoded with a fewer number of bits per pixel than the second region.

The method may further include obtaining, by the encoder, a number of pixels per block, receiving, by the encoder, a current block of the image, determining, by the encoder, a quantization parameter of the current block, coding, by the encoder, the current block with the quantization parameter, updating, by the encoder, a number of remaining pixels of the image to be coded, and updating, by the encoder, a number of remaining bits for coding the remaining pixels.

The method may further include determining, by the encoder, a number of allocated base bits per block based on the number of remaining pixels in the image to be coded, the number of remaining bits available for coding the remaining pixels in the image, and a number of remaining pixels in the second region to be coded.

If the current block belongs to the second region, the method may further include calculating, by the encoder, a number of remaining enhancement bits available for coding the current block based on a number of the remaining second region pixels and a number of enhancement bits per block, the number of enhancement bits per block represents a difference between a target bits per block of the second region and a target bits per block of the first region.

The method may further include calculating, by the encoder, a difference between the number of remaining bits available for coding the remaining pixels of the image and the number of remaining enhancement bits, and calculating, by the encoder, a number of allocated base bits per block of the first region and the second region based on the number of remaining pixels of the image and the difference.

The method may further include calculating, by the encoder, when the current block of the image is in the second region, a total number of allocated bits per block for coding the current block is calculated based on a sum of the number of allocated base bits per block of the first region and the second region and the number of enhancement bits per block.

The quantization parameter of the current block may be determined based on a quantization parameter of a block coded immediately prior to the current block, a number of bits used to code the block immediately prior to the current block, and a number of bits allocated for the current block, wherein when the current block of the image is in the first region, the number of bits allocated for the current block is the allocated base bits per block for the first region, and when the current block of the image is in the second region, the number of bits allocated for the current block is the total number of allocated bits per block for the second region.

According to another embodiment of the present disclosure, there is provided a video data encoder for coding video data, the encoder including a memory for buffering the video data, and a processor configured to control the encoder, wherein the encoder is configured to identify a first region of the image and a second region of the image, a sum of a first number of pixels in the first region and a second number of pixels in the second region being equal to a total number of pixels of the image, and allocate a first number of bits including base bits for encoding the first region, and a second number of bits including base bits and enhancement bits for encoding the second region, a sum of the first number of bits and the second number of bits being equal to a total number of bits for encoding all of the pixels, wherein the second region is encoded with a greater number of bits per pixel than the first region.

The second region may include a high-resolution region that corresponds to a fixation point of a user viewing the image on a display, wherein the first region includes a low-resolution region that is outside the fixation point.

The encoder may be further configured to identify a third region of the image, wherein the third region is encoded with a greater number of bits per pixel than the first region, and is encoded with a fewer number of bits per pixel than the second region.

The encoder may be further configured to obtain a number of pixels per block, receive current block of the image, determine a quantization parameter of the current block, code the current block with the quantization parameter, update a number of remaining pixels of the image to be coded, and update a number of remaining bits for coding the remaining pixels.

The encoder may be further configured to determine a number of allocated base bits per block based on the number of remaining pixels in the image to be coded, the number of remaining bits available for coding the remaining pixels in the image, and a number of remaining pixels in the second region to be coded.

If the current block belongs to the second region, the encoder may be further configured to calculate a number of remaining enhancement bits available for coding the current block based on a number of the remaining second region pixels and a number of enhancement bits per block, the number of enhancement bits per block represents a difference between a target bits per block of the second region and a target bits per block of the first region.

The encoder may be further configured to calculate a difference between the number of remaining bits available for coding the remaining pixels of the image and the number of remaining enhancement bits, and calculate a number of allocated base bits per block of the first region and the second region based on the number of remaining pixels of the image and the difference.

The encoder may be further configured to calculate when the current block of the image is in the second region, a total number of allocated bits per block for coding the current block is calculated based on a sum of the number of allocated base bits per block of the first region and the second region and the number of enhancement bits per block.

The quantization parameter of the current block may be determined based on a quantization parameter of a block coded immediately prior to the current block, a number of bits used to code the block immediately prior to the current block, and a number of bits allocated for the current block, wherein when the current block of the image is in the first region, the number of bits allocated for the current block is the allocated base bits per block for the first region, and when the current block of the image is in the second region, the number of bits allocated for the current block is the total number of allocated bits per block for the second region.

According to another embodiment of the present disclosure, there is provided a non-transitory computer readable medium implemented on a video data encoder for coding video data, and including a memory for buffering the video data, and a processor for controlling the encoder, wherein the medium has stored thereon instructions that, when executed, cause the encoder to identify a first region of the image and a second region of the image, a sum of a first number of pixels in the first region and a second number of pixels in the second region being equal to a total number of pixels of the image, and allocate a first number of bits including base bits for encoding the first region, and a second number of bits including base bits and enhancement bits for encoding the second region, a sum of the first number of bits and the second number of bits being equal to a total number of bits for encoding all of the pixels, wherein the second region is encoded with a greater number of bits per pixel than the first region.

The instructions, when executed by the processor, may further cause the encoder to identify a third region of the image, wherein the third region is encoded with a greater number of bits per pixel than the first region, and is encoded with a fewer number of bits per pixel than the second region.

Accordingly, the codec or encoder of embodiments of the present disclosure is able to improve methods of image data compression by demarcating different regions of resolution, by assigning bits for a block of the image depending on which region it corresponds to, and by updating a count of remaining available bits after coding a block.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

As discussed above, perception of the human eye is not uniform from the center of the field of view (FOV) to a periphery of the FOV. To reduce bandwidth, it may be beneficial to compress image data according to how the displayed image data is expected to be perceived by a user. That is, to reduce bandwidth, it may be beneficial to compress image data corresponding to a periphery of an image further than image data corresponding to a center of the image.

Further, although display resolution of display screens continues to increase, the bandwidth of the underlying link that brings the data from the application processor to the display has not increased at an equivalent rate.

Accordingly, an improved system for implementing different resolution levels, or different levels of resolution, in respective resolution regions on a display screen(s), such as those of a virtual reality (VR) headset, may be beneficial.

Figure 1:
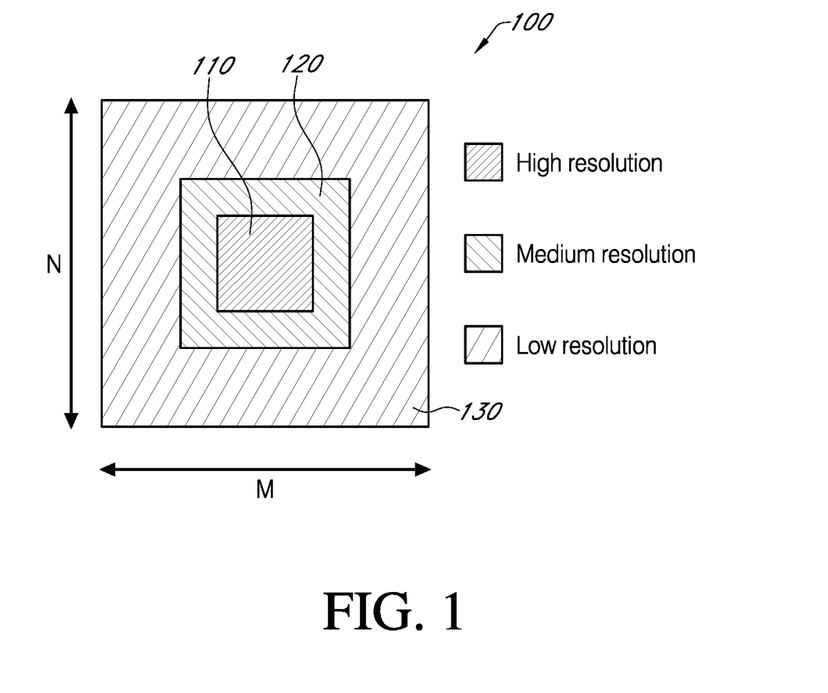
FIG. 1 illustrates an image comprising different resolution regions having different respective resolutions, according to an embodiment of the present disclosure.

FIG. 1 illustrates an image comprising different resolution regions having different respective resolutions, according to an embodiment of the present disclosure.

Referring to FIG. 1, an image 100 for a display (e.g., a display of a VR headset) is shown. The image 100 may include N×M pixels, N and M being integers. It should be noted that, although the term "image" is used herein, this term may be equally applied to "slice of an image." That is, although it is described herein that an image 100 is compressed, it should be understood that the disclosed embodiments may also be used to compress a slice of an image.

The present embodiment uses multi-resolution shading for the image 100 to be displayed to account for human perception. That is, the image 100 implements multi-resolution shading to account for differences in human perception that correspond to the FOV of the human eye. Accordingly, because visual acuity is not uniform across the FOV of the human eye, visual quality is not uniform across the image 100.

For example, higher resolution may be used in a high-resolution region 110 of the image 100 in an area corresponding to where human perception is highly sensitive (e.g., a region or area of the display corresponding to the fovea of the human eye). As an example, the high-resolution region 110 may be a visually lossless area (e.g., may display image data that is uncompressed, or that is compressed using a lossless compression rate). Further, low resolution may be used in a low-resolution region 130 of the image 100 for the display corresponding to less sensitive regions (e.g., areas of the display that correspond to regions toward the periphery of the FOV of the human eye).

Figure 5:
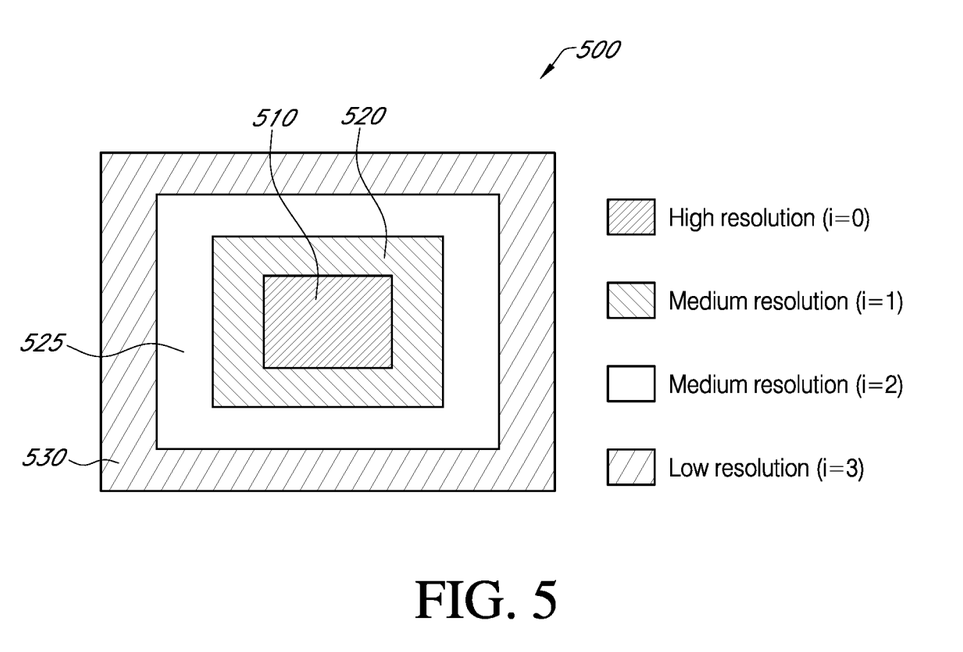
FIG. 5 illustrates an image for a display having four different resolution regions having different respective resolutions, according to an embodiment of the present disclosure.

One or more different medium-resolution regions 120 of the image 100 that have a medium resolution may exist between the high-resolution region 110 and low-resolution region 130 of the image 100 of the display to allow for the perception of a smoother transition from the center to the edge of the image 100 (e.g., see FIG. 5). That is, although the display of the present embodiment indicates one medium-resolution region 120 having an intermediate/medium level of resolution between that of the low and high-resolution regions 110, 130, other embodiments are not limited thereto. In other embodiments, multiple layers or regions having different resolution levels (e.g., varying medium resolution levels) may be enable the user of the VR headset to perceive a smoother transition from the low-resolution region 130 to the high-resolution region 110.

It should be noted that the various high, medium, and low-resolution regions 110, 120, and 130 that are shown in FIG. 1 are merely examples. In other embodiments, analysis and testing may be used to determine the number, location, and shape of the regions (e.g., after dewarping by a lens of a VR headset). For example, although the high, medium, and low-resolution regions 110, 120, and 130 are shown to be rectangular in the image 100 of FIG. 1, various high, medium, and low-resolution regions may be circular or elliptical, or may be discontinuous, according to other embodiments.

Accordingly, blocks of the image may be coded differently depending on a resolution level of the region in which they are located, and the display may utilize multi-resolution VR compression based on multi-resolution shading. For example, respective bits may be allocated to the different high, medium, and low-resolution regions 110, 120, and 130 depending on a level of sensitivity of expected human perception of a user of the VR headset including the display (e.g., with a larger number of bits per pixel or bits per block being assigned to the regions having a higher resolution). However, an encoder of a display codec is generally unable to analyze an entirety of the image due to memory constraints before it begins to compress the image. That is, the encoder generally analyzes different blocks of the image as it receives them without foreknowledge of the characteristics of the blocks it has yet to receive.

For a single resolution rate control in VDC-M, given an image 100 having a total number of P pixels and total number of B bits that may be allocated to the pixels (P and B being integers), embodiments of the present disclosure may enable determining how to distribute, or allocate, the respective bits per block (e.g., blocks having a block size of 8×2 pixels) to improve or maximize quality as described below. That is, because certain blocks of pixels will be afforded a larger number of bits than others, and because it is not generally known how the bits will be allocated to the various blocks before compression of the image 100 begins (e.g., because blocks of pixels may be compressed serially as image data enters the compression device, such as a VDC-M coder/encode), the present embodiment provides a method for determining how to improve bit allocation as compression of an image progresses, and in accordance with multi-resolution shading.

For each block of pixels (e.g., each block having 8×2 pixels for a total of 16 pixels per block), "bitsAllocated" (e.g., a number of bits assigned to the block, or an average number of bits per block) may be determined or calculated based on the remaining, or available, bits for an image (e.g., the image 100 of FIG. 1) "$B^r$," and based on the remaining pixels in the image 100 "$P^r$." In the examples provided below, for a first block in a display stream, $B^r=B$ and $P^r=P$.

When the block corresponds to 16 pixels, the average number of bits to be allocated for each block can be calculated by Equation 1.

$$bitsAllocated = \frac{16 * B^r}{P^r} \quad \text{Equation 1}$$

Accordingly, Equation 1 allows for an equal allocation of remaining bits among remaining pixels (e.g., such that each block is allocated a same number of bits). This may be an acceptable strategy, or maybe even the best strategy, when the complexity of future blocks is not known (e.g., when the rates of compression of the yet-to-be compressed blocks are not known).

However, because an image 100 will generally have varying levels of complexity, or texture, in different regions of the image 100, it may be useful to vary the number of bits allocated to different blocks as compression continues. That is, as compression continues, it may be useful to adjust bitsAllocated based on an ongoing average compression rate.

Accordingly, based on the determination of bitsAllocated in Equation 1, complexity of a current block of pixels with regard to other blocks of pixels in its neighborhood (e.g., previous blocks in the region of the current block) may be estimated. A complexity measure may be used to determine or calculate a quantization parameter ("QP") value of the current block "curBlock$_{QP}$" based on the QP value of a previous block "prevBlock$_{QP}$" using Equation 2.

$$curBlock_{QP} = prevBlock_{QP} + \delta_{QP} \quad \text{Equation 2}$$

In Equation 2, $\delta_{QP}$ is positive if the complexity of the current block is greater than the previous blocks in its neighborhood, is negative if the current block is less complex than the previous blocks in its neighborhood, and may be zero if the complexity between the current and previous blocks is the same or similar.

By continually measuring the complexity for each block and by adjusting curBlock$_{QP}$ based on $\delta_{QP}$, the image 100 is able to be processed without likely using a number of bits that exceeds the total number of bits "B" assigned to the image 100, and also without having a large number of remaining bits "B'" upon completion of the processing of the image 100. That is, Equation 2, in conjunction with the remainder of the process of the present embodiment, helps to ensure that neither too many nor too few bits are used in the processing of the image 100.

Accordingly, the number of bits allocated to the current block may be adjusted upwardly or downwardly from the average number of bits allocated to the remaining blocks (e.g., "bitsAllocated") based on the determined QP, which may be used to calculate "curBlock$_{QP}$". As QP increases, a step size corresponding to the image also increases, along with a distortion of the image, while the corresponding bitrate decreases.

Once the number of bits allocated to the current block is determined (e.g., based on curBlock$_{QP}$), the current block is coded, and the actual number of bits used to code the current block is subtracted from the remaining bits in the image 100 such that number of remaining bits "B'" may be updated. Thereafter, the above first and second operations may be repeated for a next block.

Figure 2:
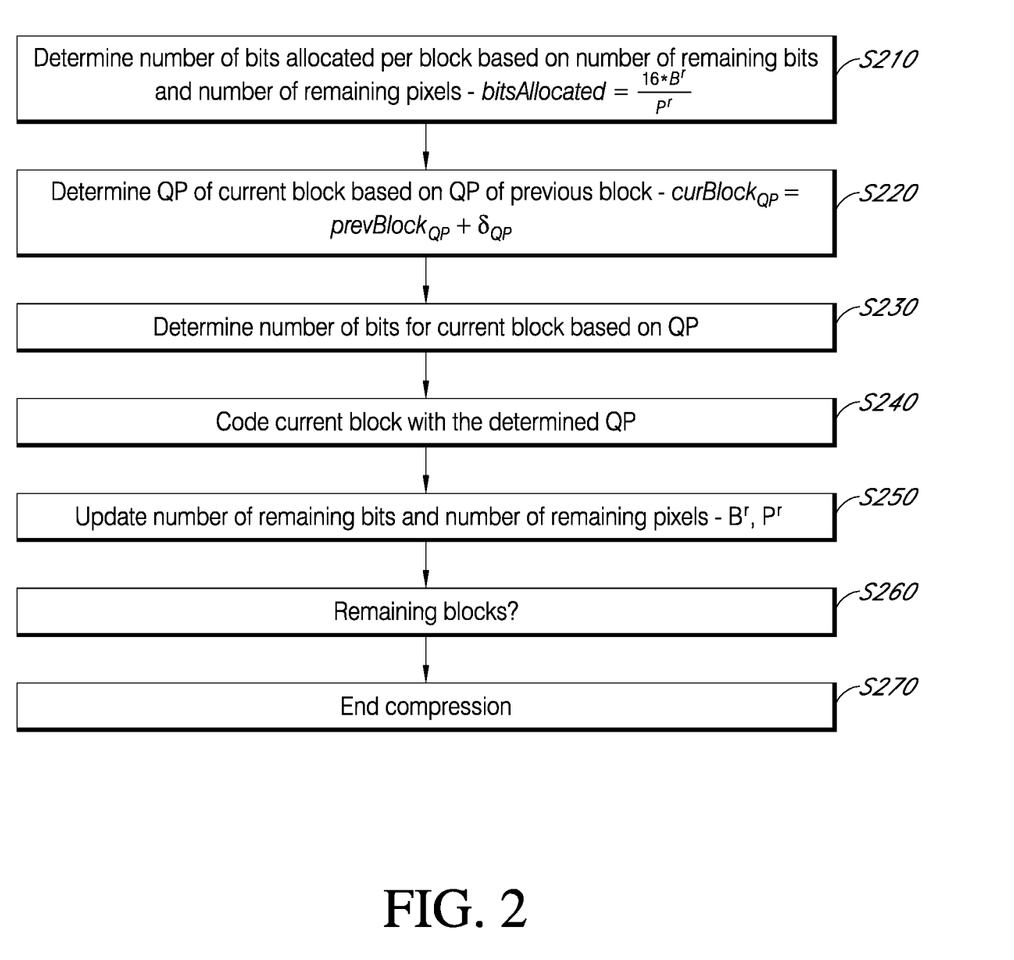
FIG. 2 is a flowchart illustrating a method for assigning varying numbers of bits to blocks during compression of a display stream, according to an embodiment of the present disclosure.

To summarize the above, FIG. 2 is a flowchart illustrating a method for assigning varying numbers of bits to blocks during compression of a display stream, according to an embodiment of the present disclosure.

Referring to FIG. 2, at S210 an encoder of the present embodiment may determine a number of bits allocated per block (e.g., an average number of bits per block for the image) based on a number of remaining bits for the image and a number of remaining pixels in the image (e.g., the encoder may determine $$bitsAllocated = \frac{16 * B^r}{P^r}\Big).$$

However, it should be noted that the determination of the bitsAllocated involves a floating point calculation between two large integers. In addition, because the number of remaining pixels $P^r$ changes as blocks of pixels are processed and coded, it may be impractical to pre-compute the calculation of the bitsAllocated. To avoid such floating point calculation, calculation of the bitsAllocated may use a fixed-point divider implementation. Further, after a fixed point target rate approximation is determined, a secondary LUT may be used to adjust the target rate approximation. Additionally, bitshifting may be used to avoid use of a division operation for calculating the bitsAllocated.

For example, for each pixel block, the target bit rate per block (TR$_{ideal}$) is updated based on the number of bits (B) and the number of pixels (P) remaining in a slice or image. Accordingly, $$TR_{ideal} = \frac{16B}{P}$$

when there are 16 pixels per block. To avoid floating point computations, a fixed point estimate is used, such that TR$_0 \approx$ TR$_{ideal}$.

Accordingly, the denominator of the equation (P) may be converted to P=$2^N \cdot p$ where p$\in$[0.5, 1). Then, $$\frac{16 \cdot B}{P} = \frac{16 \cdot B}{2^N \cdot p} = [16 \cdot B \cdot f(p)] \gg N,$$

and the function $$f(p) = \frac{2^{n_0}}{p}$$

in a LUT for p$\in[2^{n_o-1}, 2^{n_o})$ can be stored in the LUT.

Furthermore, there may be an offset parameter added to the TR$_0$ for FLS as the quality of FLS may be useful (e.g., due to prediction). Accordingly, TR=TR$_0+\delta_{FLS}$, where $\delta_{FLS}$ allocates extra bits to blocks within the first line of the slice or image, and where $\delta_{FLS}$=16·FirstLineBpgOffset=16.2=32.

At S220, the encoder may determine a quantization parameter of a current block received by the encoder for compression based on a quantization parameter of at least one neighboring blocks). In one embodiment, the at least one neighboring blocks is the block coded immediately prior to the current block. And the quantization parameter of a current block is given by curBlock$_{QP}$=prevBlock$_{QP}$+$\delta_{QP}$.

At S230, the encoder may determine a number of bits for coding the current block based on the determined quantization parameter of the current block (e.g., the encoder may code the current block based on curBlock$_{QP}$). Then, at S240, the encoder may code the current block with the determined QP, and may send the block to a decoder.

At S250, the encoder may update the number of remaining bits that may be used to compress the image, and based on the number of remaining pixels of the image to be compressed (e.g., the encoder may update $B^r$ and $P^r$).

At S260, the encoder may receive a next block of pixels for compression, and may return to S210 until the last block of the image 100 has been coded, and may end compression of the image at S270 once no additional blocks remain.

Conventionally, for single-resolution compression, VDC-M rate control allocates bits based on the quantization parameter of the blocks in a given portion of an image. Accordingly, more bits may be allocated to blocks of a complex portion (e.g., an area or region of an image having a lower compression rate, such as a region corresponding to a natural image having more texture), and fewer bits may be allocated to blocks of a flat, or smooth, portion (e.g., a computer-generated region, or a natural region, which may be compressed at a higher rate without sacrificing a large degree of quality of the image 100).

Contrastingly, according to the present embodiment, for multi-resolution compression, the encoder may allocate more bits to blocks of the high resolution region 110 than to blocks of the low-resolution region 130. For example, more bits may be allocated to the high-resolution region 110 to maintain higher quality, while fewer bits may be allocated to the low and medium-resolution regions 120, 130, and more bits may be allocated to the medium-resolution region 120 than to the low-resolution region 130.

Given an image 100 having a total of P pixels and a total bits of B that may be used by the encoder to code the image 100, embodiments of the present disclosure may suitably allocate different amounts of the available bits for a current pixel block based on a quality variation across different regions 110, 120, and 130, and may also do so based on a complexity variation within one or more of each of the regions 110, 120, and 130.

Figure 3:
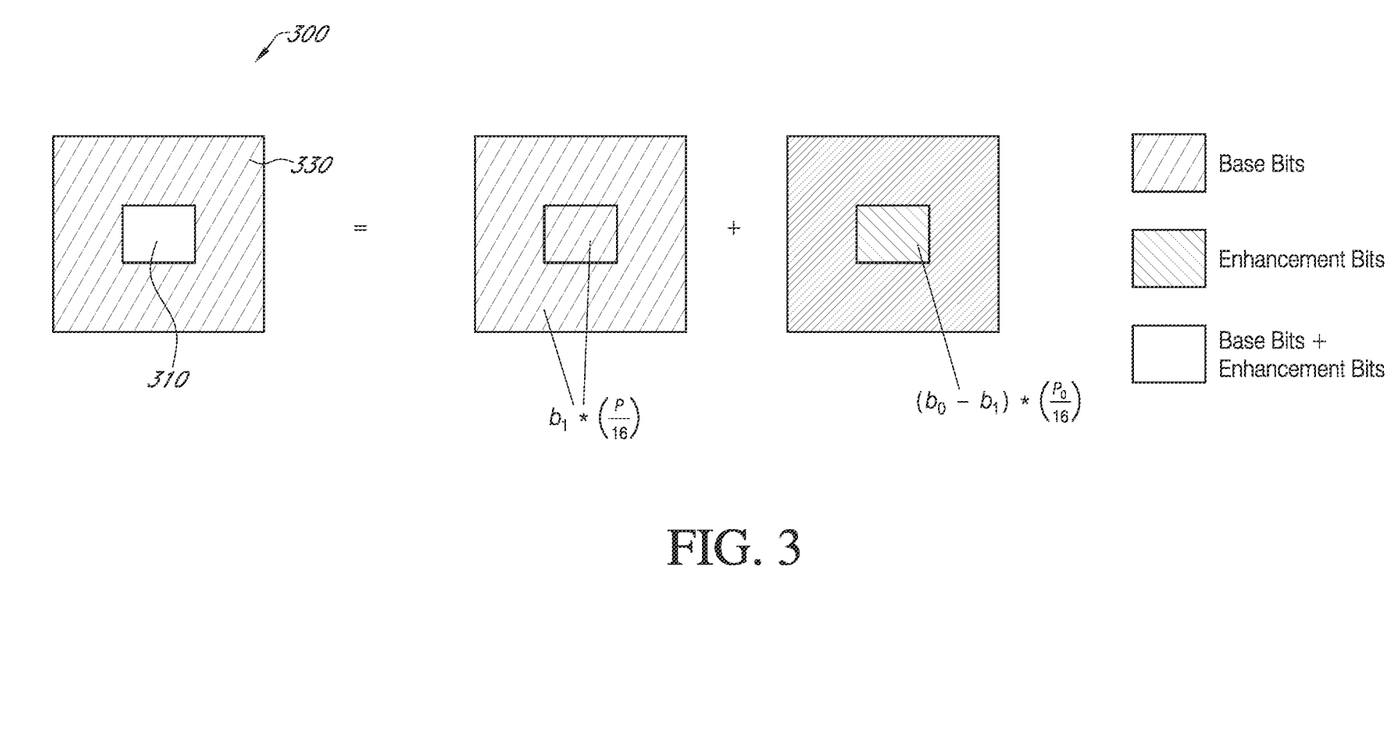
FIG. 3 illustrates an image comprising different resolution regions and the concept of multi-resolution shading, according to an embodiment of the present disclosure.

FIG. 3 illustrates an image comprising different resolution regions and the concept of multi-resolution shading, according to an embodiment of the present disclosure.

Referring to FIG. 3, according to the present embodiment multi-resolution shading is able to account for differences in human perception as they correspond to different regions corresponding to the FOV of the eye, and is able to selectively budget the bitrate of the encoder based thereon (e.g., a region corresponding to a center of the FOV corresponds to a higher visual acuity, and may also correspond to a fixation region, or high-resolution region). For simplicity, a displayed image 300 of the present example includes only two different resolution regions (e.g., a high-resolution region 310 and a low-resolution region 330). However, the present example can be extended to other embodiments that include additional-resolution regions (e.g., the medium-resolution region 120 of the image 100 of FIG. 1 or the medium-resolution regions 520 and 525 of the image 500 of FIG. 5, described below). The high and medium-resolution regions of the described embodiments may also be referred to as enhanced regions.

In the present example, and for ease of description of the Equations discussed below, the low-resolution region 330 is referred to as "region 1," and the high-resolution region 310 is referred to as "region 0." During processing, these regions 310, 330 of the image 300 may be defined by a bitmask, wherein one region is defined by one value of the bitmask (e.g., a value of 1) and the other region is defined by another value of the bitmask (e.g., a value of 0).

The bits per block assigned to a given region (e.g., "region i," i being an integer corresponding to the region, such that i=1 or 0 in the present example) is "$b_i$" bits per block. In the present example, the number of bits per block $b_0$ for the high-resolution region 310 (i.e., region 0) is greater than the number of bits per block $b_1$ for the low-resolution region 330 (i.e., region 1), as shown in Equation 3.

$$b_0 > b_1 \qquad \text{Equation 3}$$

The number of pixels in region i is "$P_i$." The total number of pixels P in the image is equal to a summation of the pixels $P_i$ in each of the regions. That is, P for the image 300 of the present example is equal to a summation of the number of pixels $P_0$ in the high-resolution region 310 and the number of pixels $P_1$ in the low-resolution region 330, as shown in Equation 4.

$$P = P_1 + P_0 \qquad \text{Equation 4}$$

Similarly, the number of bits assigned to region i for coding is $B_i$. $B_i$ is determined by multiplying the bits per block $b_i$ for the region i by the total number of pixels $P_i$ for that region divided by the number of pixels per block (16 pixels per block for the 8×2 blocks of pixels in the present example). This may be expressed by Equation 5.

$$B_i = b_i * (P_i / 16). \qquad \text{Equation 5}$$

Accordingly, in the present example, the total number of bits B that are allocated for encoding the image 300 is equal to a summation of the total number of bits "$B_1$" to the low-resolution region 330 and the total number of bits "$B_0$" to the high-resolution region 310. In a manner similar to Equation 4, the total number of bits B for the entire image 300 may be expressed by Equation 6.

$$B = B_1 + B_0. \qquad \text{Equation 6}$$

The present embodiment provides a novel solution by splitting the bits per block to the high-resolution region 310 into "base bits" per block and "enhancement bits" per block. The base bits for each block in the high-resolution region 310 will be the same bits per block available to the low-resolution region 330 (e.g., will be the same as $b_1$), as the blocks in the low-resolution region 330 will not be assigned any enhancement bits. That is, the total number of bits B may be separated into base bits for the entire image (e.g., both regions 310, 330), and enhancement bits for only the enhanced region (e.g., the high-resolution region 310 of the image 300).

Accordingly, the total number of bits $B_0$ assigned to the high-resolution region 310 may be expressed by Equation 7.

$$B_0 = b_0 * \frac{P_0}{16} = b_1 * \left(\frac{P_0}{16}\right) + (b_0 - b_1) * \left(\frac{P_0}{16}\right) \qquad \text{Equation 7}$$

where the term $$b_1 * \left(\frac{P_0}{16}\right)$$

may be referred to as the base bits, which corresponds to the bits per block for both regions 310, 330, and $$(b_0 - b_1) * \left(\frac{P_0}{16}\right)$$

may be referred to as the enhancement bits, allocated for the high-resolution region 310. The number of available enhancement bits may be used to calculate the "enhancement bits per block," for the blocks of the high-resolution region 310. A number of the enhancement bits per block may correspond to a difference between a number of target bits per block of the high-resolution region 310 and a number of target bits per block of the low-resolution region 330, (i.e., ($b_0-b_1$)) as both regions 310, 330 may use the same number of base bits per block. In one embodiment, the enhancement bits per block is a fixed number.

As an example, if the size of the image 300 is 160×160 pixels (i.e., $P=160^2$), and if the size of the high-resolution region 310 is 32×32 pixels (i.e., $P_0=32^2$), then, according to the above equations, the bits per block to the high-resolution region 310 is 85 bits (i.e., $b_0=85$, and the bits-per-pixel "$bpp_0$"=5.3125, which corresponds to a compression ratio of 1.5:1, assuming each pixel in the image 300 is represented using 8 bits). Further, in the present example, the bits per block to the low-resolution region 330 is 16 bits (i.e., $b_1=16$, and $bpp_1=1.0$, corresponding to a compression ratio of 8:1, assuming each pixel in the image 300 is represented using 8 bits).

Accordingly, by using Equation 7 above, the total number of bits $B_0$ to the high-resolution region 310 is 5,440 bits, which is equal to a summation of 1,024 base bits in the high-resolution region 310 and 4,416 enhancement bits. Furthermore, in the present example, and according to Equation 6 above, the total number of bits available to the entire image 300 is 30,016 bits, with 25,600 base bits spread evenly over the entire image 300 including both the high and low-resolution regions 310, 330, and 4,416 enhancement bits used in only the high-resolution region 310.

Because the enhancement bits may come at a premium, the present embodiment may track the number of available enhancement bits remaining during a coding process. Accordingly, the bitsAllocated per block for the high and low-resolution regions 310, 330 can be determined, as follows.

A number of base bits that are allocated per block may be determined for the entire image 300 including both the high and low-resolution regions 310, 330. The number of base bits allocated per block may be equal to the number of bits allocated per block for the low resolution region (e.g., (bitsAllocated)$_1$, which is described further below). A total number of bits B allotted for the image 300 less the enhancement bits $$(b_0 - b_1) * \left(\frac{P_0}{16}\right)$$

may be distributed to the entire image 300 based on the overall complexity of the image 300 (e.g., in a manner that is similar to the VDC-M single resolution case).

For the high-resolution region 310, the enhancement bits per block may be added to the base bits per block to determine the total number of bits allocated per block for the high-resolution region 310 (i.e., both base bits per block and enhancement bits per block). Accordingly, additional enhancement bits (e.g., the bits remaining after the base bits are allocated) can be allocated to the high-resolution region 310 to generally provide a higher quality image therein.

The multi-resolution shading of the present embodiment may be distinguished from VDC-M single resolution by keeping track of the remaining blocks of pixels of the high-resolution region 310 that remain in the image 300 to be coded due to the dependence of the enhancement bits $$\left((b_0 - b_1) * \left(\frac{P_0}{16}\right)\right).$$

When all of the blocks of the high-resolution region 310 are coded, the term $$(b_0 - b_1) * \left(\frac{P_0}{16}\right) = 0.$$

According to the present embodiment, the encoder may code the bits as follows.

The bitsAllocated for each block may be continually updated based on the remaining bits in the image 300 (i.e., $B^r$ from Equation 1), based on the remaining pixels in the image 300 (i.e., $P^r$ from Equation 1), and based on the remaining pixels in the high-resolution region 310 ($P_0^r$) in the image 300. Accordingly, if each block of pixels is 8×2 (i.e., 16 pixels per block), then the number of bitsAllocated per block for the low-resolution region 330 is represented by "(bitsAllocated)$_1$," which may be expressed by Equation 8.

$$(bitsAllocated)_1 = \frac{16 * \left(B^r - (b_0 - b_1) * \left(\frac{P_0^r}{16}\right)\right)}{P^r} \qquad \text{Equation 8}$$

The term $$(b_0 - b_1) * \left(\frac{P_0^r}{16}\right),$$

which resembles, but should not be confused for, the total number of enhancement bits for the high-resolution region 310, refers to the remaining enhancement bits available to the high-resolution region 310. This term will equal zero when $b_0=b_1$ (e.g., this may boil down to single resolution case).

For blocks in the high-resolution region 310, bits allocated per block "(bitsAllocated)$_0$," may be determined using Equation 9

$$(bitsAllocated)_0 = (bitsAllocated)_1 + (b_0 - b_1) \qquad \text{Equation 9}$$

where ($b_0-b_1$) represents the enhancement bits per block that may be allocated in the high-resolution region 310 in comparison to the bits allocated per block in the low-resolution region 330 (e.g., base bits allocated per block for the entire image 300 may be equal to (bitsAllocated)$_1$, as the low-resolution region 330 is coded with only base bits).

The QP value of the current block received by the encoder to be encoded may be determined based on the determined bitsAllocated and the complexity of the current block with respect to the neighboring blocks as may be done in VDC-M rate control.

Figure 4:
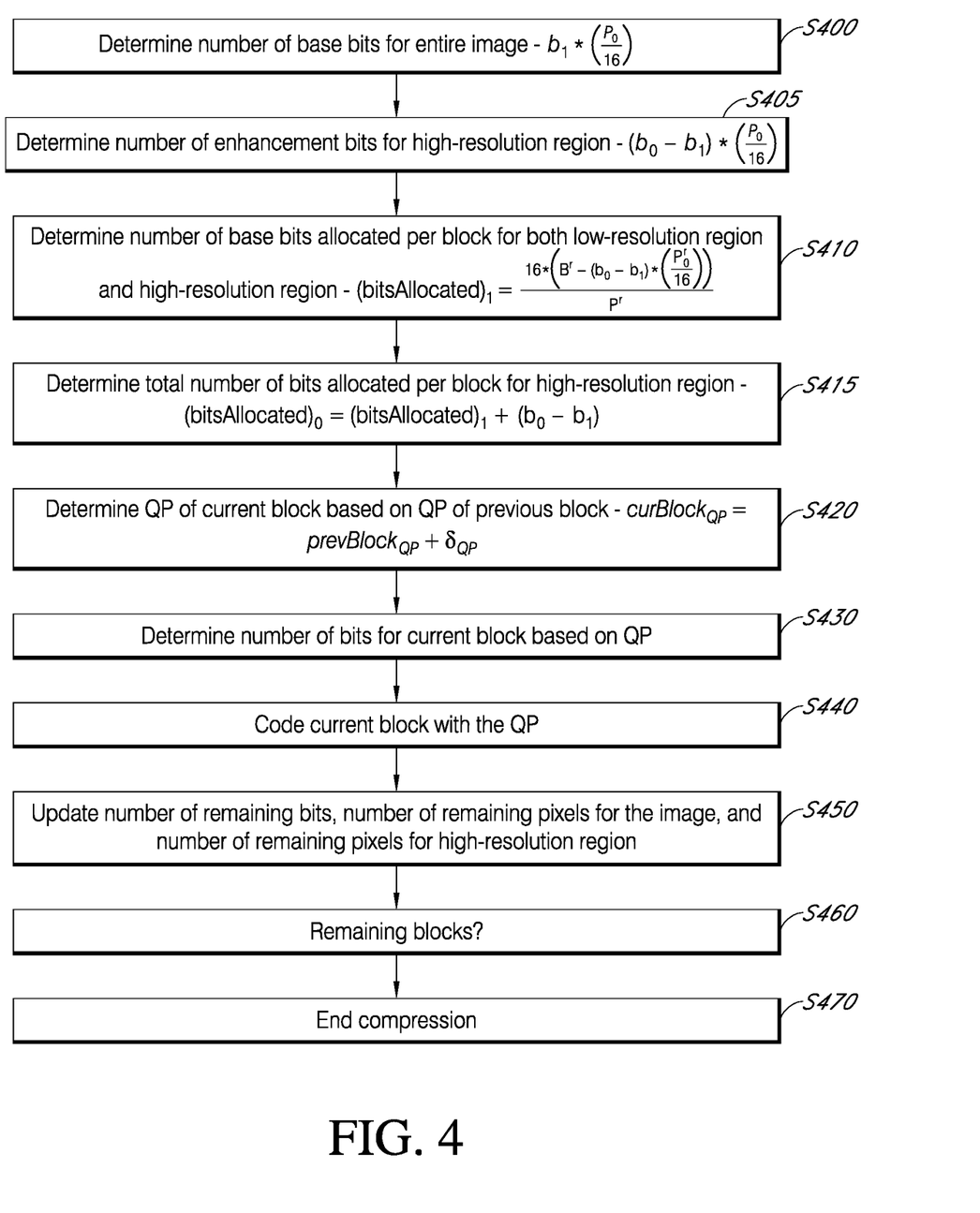
FIG. 4 is a flowchart illustrating a method for assigning varying numbers of bits to blocks in regions of differing resolution during compression of a display stream, according to an embodiment of the present disclosure.

To summarize the above, FIG. 4 is a flowchart illustrating a method for assigning varying numbers of bits to blocks in regions of differing resolution during compression of a display stream, according to an embodiment of the present disclosure.

Referring to FIG. 4, at S400, an encoder of the present embodiment may determine a number of base bits for the entire image (e.g., the encoder may determine $$b_1 * \left(\frac{P}{16}\right)).$$

At S405, the encoder may determine a number of enhancement bits for only a high-resolution region (e.g., the encoder may determine $$(b_0 - b_1) * \left(\frac{P_0}{16}\right)).$$

At S410, the encoder may determine the number of base bits allocated per block for both the low-resolution region and the high-resolution region (e.g., the encoder may update $$(bitsAllocated)_1 = \frac{16 * \left(B^r - (b_0 - b_1) * \left(\frac{P_0^r}{16}\right)\right)}{P^r},$$

which may be equal to the number of base bits allocated per block for all remaining blocks).

At S415, the encoder may determine the total number of bits allocated per block for the high-resolution region by adding the number of base bits allocated per block to the number of enhancement bits allocated per block for the high-resolution region (e.g., the encoder may determine $(bitsAllocated)_0 = (bitsAllocated)_1 + (b_0 - b_1)$).

At S420, the encoder may determine a quantization parameter of a current block based on the quantization parameter of one or more previously encoded neighboring blocks (e.g., the encoder may determine $curBlock_{QP} = prevBlock_{QP} + \delta_{QP}$).

At S430, the encoder may determine a number of bits for the current block based on the quantization parameter of the current block. Then, at S440, the encoder may code the current block with the QP, thereby removing bits from the pool of unused remaining bits, and may send the current block to the decoder.

At S450, the encoder may update a number of remaining bits, a number of remaining pixels for the image, and a number of remaining pixel for the high-resolution region.

At S460, the encoder may receive a next block of pixels for compression, and may return to S410 until the last block of the image 300 has been coded, and may end compression of the image at S470 once no additional blocks remain.

FIG. 5 illustrates an image for a display having four different resolution regions having different respective resolutions, according to an embodiment of the present disclosure.

Referring to FIG. 5, the embodiments of the present disclosure, as described above, may be modified to apply to a display having $\mathcal{R}$ regions ($\mathcal{R}$ being an integer, where $\mathcal{R}$ is 4 in the present example). The image 500 of the present embodiment has a high-resolution region 510, a low-resolution region 530, and two medium-resolution regions 520 and 525.

According to the present embodiment, Equation 3 above can be modified to produce Equation 10 below to express the bits per block "$b_i$" to a given region "region i".

$$b_0 > b_1 > b_2 > b_3 \ldots > b_{\mathcal{R}-1} \quad \text{Equation 10}$$

Equation 4 above can be modified to produce Equation 11 below to express the total number of pixels P in the image 300.

$$P = \sum_{i=0}^{\mathcal{R}-1} P_i \quad \text{Equation 11}$$

Similarly, Equation 6 above can be modified to produce Equation 12 below to express the total number of bits allocated B in the image 300.

$$B = \sum_{i=0}^{\mathcal{R}-1} B_i \quad \text{Equation 12}$$

Accordingly, Equation 5 above can be modified to produce Equation 13 below to express the total bits "$B_i$" to a region i.

$$B_i = b_i * \frac{P_i}{16} = b_{R-1} * \left(\frac{P_i}{16}\right) + (b_i - b_{R-1}) * \left(\frac{P_i}{16}\right) \quad \text{Equation 13}$$

where the base bits delivered to all of the regions 510, 520, 525, 530 of the image 500 may be represented by $$b_{R-1} * \left(\frac{P_i}{16}\right),$$

and where the enhancement bits delivered to regions 310, 320, 325 other than the low-resolution region 330 may be represented by $$(b_i - b_{R-1}) * \left(\frac{P_i}{16}\right).$$

Using these equations, the embodiment described above can be extended to more regions by splitting each region i, where $i \neq \mathcal{R} - 1$, into base bits and enhancement bits.

For each block, bitsAllocated (size 8×2) may be updated based on the remaining bits for encoding the image 500 ($B^r$), the remaining pixels in image 500 ($P^r$), and the remaining pixels $P_0^r, P_1^r, \ldots P_{\mathcal{R}-2}^r$ respectively located in regions 0, 1, . . . $\mathcal{R}$ −2.

Accordingly, Equation 8 above can be modified to produce Equation 14 below to express a number of base bits allocated per block.

$$(bitsAllocated)_{R-1} = \frac{16 * \left(B^r - \sum_{i=0}^{\mathcal{R}-2} (b_i - b_{R-1}) * \left(\frac{P_i^r}{16}\right)\right)}{P^r} \quad \text{Equation 14}$$

For blocks in region $\mathcal{R}$ −1 (i.e., the low-resolution region 530) bits allocated per block is set equal to the $(bitsAllocate)_{\mathcal{R}-1}$. That is, the base bits per block allocated for all of the regions may be equal to all of the bits per block allocated for the low-resolution region 530.

The enhancement bits per block for the regions 510, 520, 525 for the regions other than the low-resolution region 530 may be determined (e.g., for blocks in region i, where i≠ $\mathcal{R}-1$) by modifying Equation 9 as Equation 15 below.

$$(bitsAllocated)_i = (bitsAllocated)_{\mathcal{R}-1} + (b_i - b_{\mathcal{R}-1}) \quad \text{Equation 15}$$

Where the enhancement bits per block corresponding to blocks in each of the enhanced regions i (where i≠$\mathcal{R}-1$) may be represented by the term $(b_i-b_{\mathcal{R}-1})$.

The QP value of the current block to be coded by the encoder may be determined based on the determined bitsAllocated and the complexity of the current block with respect to the neighboring blocks (e.g., as done in VDC-M rate control). Much like the example described above with respect to FIG. 4, the encoder may then assign the QP to the current block based on the determined complexity, may code and send the current block, and may update the number of remaining base bits and the number of remaining enhancement bits. The encoder may then move on to the next block.

Figure 6:
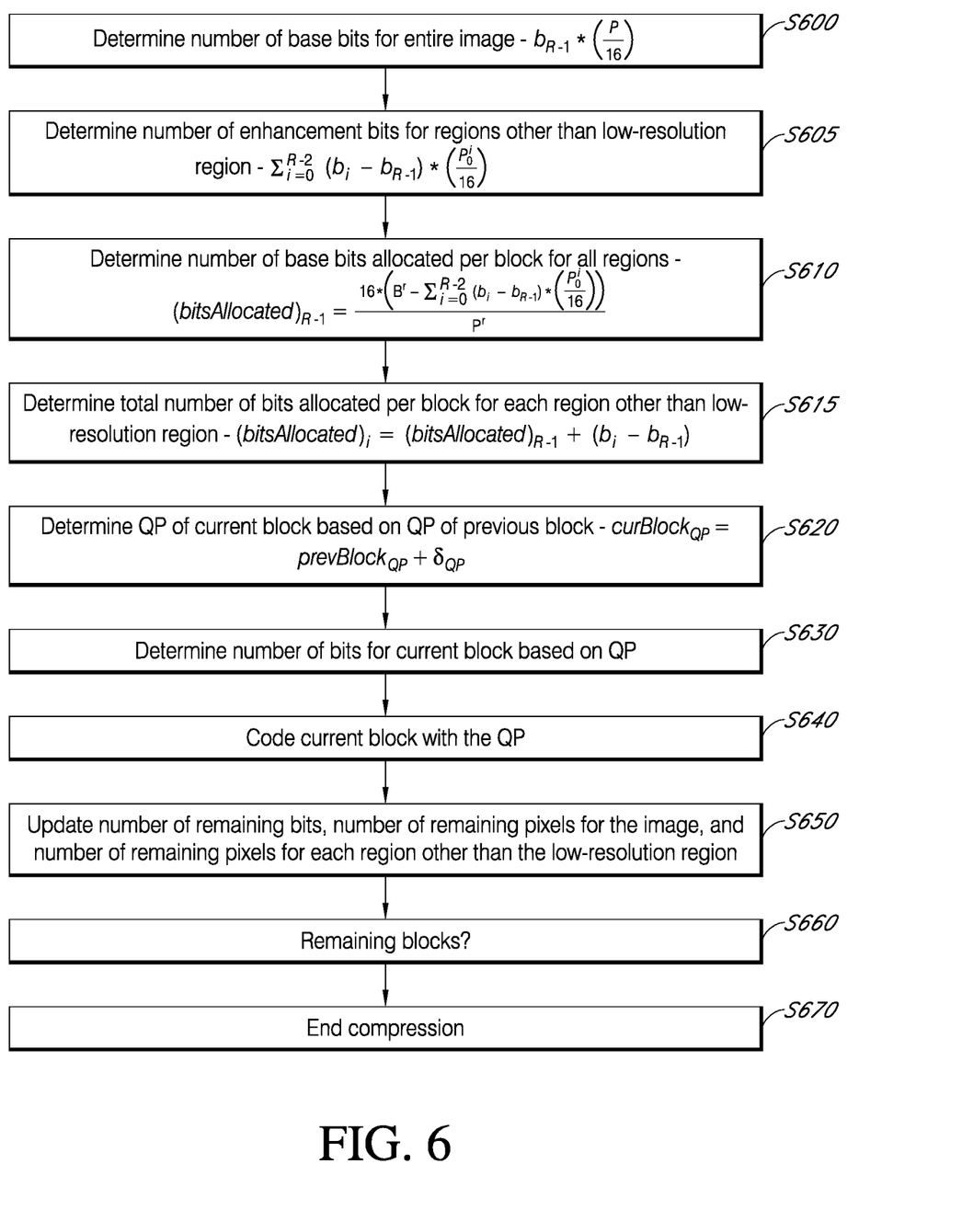
FIG. 6 is a flowchart illustrating a method for assigning varying numbers of bits to blocks in multiple regions (e.g., 3 or more regions) of differing resolution during compression of a display stream, according to an embodiment of the present disclosure.

To summarize the above, FIG. 6 is a flowchart illustrating a method for assigning varying numbers of bits to blocks in multiple regions (e.g., 3 or more regions) of differing resolution during compression of a display stream, according to an embodiment of the present disclosure.

Referring to FIG. 6, at S600, an encoder of the present embodiment may determine the number of base bits for the entire image (e.g., the encoder may determine $$b_{R-1} * \left(\frac{P}{16}\right)).$$

At S605, the encoder may determine the number of enhancement bits for regions other than low-resolution region (e.g., the encoder may determine $$\sum_{i=0}^{R-2} (b_i - b_{R-1}) * \left(\frac{P_0^i}{16}\right)).$$

At S610, the encoder may determine the number of base bits allocated per block for both the low-resolution region and the high-resolution region (e.g., the encoder may update $$(bitsAllocated)_{R-1} = \frac{16 * \left(B^r - \sum_{i=0}^{R-2}(b_i - b_R - 1) * \left(\frac{P_0^i}{16}\right)\right)}{P^r}).$$

At S615, the encoder may determine the total number of bits allocated per block for each resolution region other than low-resolution region, which may be equal to the average number of enhancement bits that may be allocated per block for the enhanced regions (e.g., the encoder may update $(bitsAllocated)_i = (bitsAllocated)_{\mathcal{R}-1} + (b_i - b_{\mathcal{R}-1})$).

At S620, the encoder may determine a quantization parameter of the current block based on the previously determined quantization parameter of one or more blocks neighboring the current block that were previously encoded by the encoder (e.g., the encoder may determine $curBlock_{QP} = prevBlock_{QP} + \delta_{QP}$).

At S630, the encoder may determine the number bits for coding the current block based on the determined quantization parameter and based on the resolution region in which the current block is located. Then, at S640, the encoder may code current block with the determined QP, and may send the coded block to the decoder.

At S650, the encoder may update the number of remaining bits, the number of remaining pixels for the image, and the number of remaining pixels for each region other than the low-resolution region.

At S660, the encoder may receive a next block of pixels for compression, and may return to S610 until the last block of the image 500 has been coded, and may end compression of the image at S670 once no additional blocks remain.

According to the examples described above, a fixation point (e.g., a point in the image corresponding to a focus of the user) may be assumed to be at the center of the image. However, the fixation point might not always correspond to the center of an image due to eye movement. Accordingly, the present embodiments can be equally applied even when the fixation point is not at the center of the image. In the latter case, the highest, medium, and low-resolution regions may be differently identified according the selected fixation point, and the proposed technique may be equally applied.

Further, the present embodiments can be applied to any fixed rate codec that uses a block-based solution of size N×M. For example, the present embodiments can be applied to a codec with or without a rate buffer. If the codec does include a rate buffer, the determined bitsAllocated per block may be further adjusted depending on how full or empty a buffer of the encoder may be (e.g., based on the state of the buffer, or based on buffer fullness). That is, before determining the QP value discussed above, the bits per block "bitsAllocated" may be adjusted according to a "buffer fullness" value, as shown in Equation 16 below.

$$bitsAllocated = bitsAllocated + \delta(BF) \quad \text{Equation 16}$$

where buffer fullness (BF) is an abstract value that represents the number of bits in the buffer of the encoder, and where $\delta(BF)$ is an offset value that is a function (e.g., monotonically decreasing) of BF. In one example, $\delta(BF)$ would be zero for all regions, except for the high-resolution region or except for the enhanced regions. In another example, $\delta(BF)$ would be zero for only the low-resolution region.

Accordingly, based on the constraints of a codec designed according to the embodiments disclosed herein, the encoder may continually determine how full its buffer is. If the buffer is relatively full (e.g., close to causing an overflow error), the encoder may increase the QP to reduce the bitrate. Similarly, if the buffer is relatively empty, the encoder may decrease the QP to increase the bitrate.

Accordingly, the encoder is able to intelligently assign different numbers of bits per block to different regions to attain different regions having different respective levels of resolution while ensuring that an image is coded without underutilizing the bits available for coding the image, and without using all of the available bits prior to encoding the last block of the image. The embodiments described herein, therefore, provide improvements to display stream technology.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of coding blocks of video data representing an image using an encoder, the method comprising:
   identifying, by the encoder, a first region of the image, a second region of the image, and a third region of the image;
   allocating, by the encoder, a first number of bits comprising base bits for encoding the first region, a second number of bits comprising base bits and enhancement bits for encoding the second region, and a third number of bits comprising base bits and enhancement bits for encoding the third region;

obtaining, by the encoder, a number of pixels per block;

receiving, by the encoder, a current block of the image;

determining, by the encoder, a quantization parameter of the current block based on a previous quantization parameter of a previous block in a region of the current block in a same image frame;

coding, by the encoder, the current block with the quantization parameter;

updating, by the encoder, a number of remaining pixels of the image to be coded;

updating, by the encoder, a number of remaining bits for coding the remaining pixels; and determining, by the encoder, a number of allocated base bits per block for a number of remaining blocks based on the number of remaining pixels in the image to be coded, the number of remaining bits available for coding the remaining pixels in the image, and a number of remaining pixels in the second region to be coded, the number of allocated base bits per block being the same for every remaining block, wherein the second region is encoded with a greater number of bits per pixel than the first region, wherein the third region is encoded with a greater number of bits per pixel than the first region, and is encoded with a fewer number of bits per pixel than the second region, and wherein the third region surrounds the first region, and is surrounded by the second region.

2. The method of claim 1, wherein the second region comprises a high-resolution region that corresponds to a fixation point of a user viewing the image on a display, and wherein the first region comprises a low-resolution region that is outside the fixation point.

3. The method of claim 1 further comprising:

determining the current block belongs to the second region; and calculating, by the encoder, a number of remaining enhancement bits available for coding the current block based on a number of the remaining pixels in the second region and a number of enhancement bits per block, the number of enhancement bits per block represents a difference between a target bits per block of the second region and a target bits per block of the first region.

4. The method of claim 3, further comprising calculating, by the encoder, a difference between the number of remaining bits available for coding the remaining pixels of the image and the number of remaining enhancement bits, wherein a number of allocated base bits per block of the first region and a number of allocated base bits per block of the second region correspond to the number of allocated base bits per block, which is based on the difference.

5. The method of claim 4, further comprising calculating, by the encoder, when the current block of the image is in the second region, a total number of allocated bits per block for coding the current block based on a sum of the number of allocated base bits per block of the first region and the second region and the number of enhancement bits per block.

6. The method of claim 5, wherein the quantization parameter of the current block is determined based on a quantization parameter of a block coded immediately prior to the current block, a number of bits used to code the block immediately prior to the current block, and a number of bits allocated for the current block, wherein when the current block of the image is in the first region, the number of bits allocated for the current block is the allocated base bits per block for the first region, and when the current block of the image is in the second region, the number of bits allocated for the current block is the total number of allocated bits per block for the second region.

7. A video data encoder for coding video data, the encoder comprising:

a memory for buffering the video data; and a processor configured to control the encoder, wherein the encoder is configured to:

identify a first region of an image, a second region of the image, and a third region of the image;

allocate a first number of bits comprising base bits for encoding the first region, a second number of bits comprising base bits and enhancement bits for encoding the second region, and a third number of bits comprising base bits and enhancement bits for encoding the third region;

obtain a number of pixels per block;

receive current block of the image;

determine a quantization parameter of the current block based on a previous quantization parameter of a previous block in a region of the current block in a same image frame;

code the current block with the quantization parameter;

update a number of remaining pixels of the image to be coded;

update a number of remaining bits for coding the remaining pixels; and determine a number of allocated base bits per block for a number of remaining blocks based on the number of remaining pixels in the image to be coded, the number of remaining bits available for coding the remaining pixels in the image, and a number of remaining pixels in the second region to be coded, the number of allocated base bits per block being the same for every remaining block, wherein the second region is encoded with a greater number of bits per pixel than the first region, wherein the third region is encoded with a greater number of bits per pixel than the first region, and is encoded with a fewer number of bits per pixel than the second region, and wherein the third region surrounds the first region, and is surrounded by the second region.

8. The encoder of claim 7, wherein the second region comprises a high-resolution region that corresponds to a fixation point of a user viewing the image on a display, and wherein the first region comprises a low-resolution region that is outside the fixation point.

9. The encoder of claim 7, wherein the encoder is further configured to:

determine the current block belongs to the second region; and calculate a number of remaining enhancement bits available for coding the current block based on a number of the remaining pixels in the second region and a number of enhancement bits per block, the number of enhancement bits per block represents a difference between a target bits per block of the second region and a target bits per block of the first region.

10. The encoder of claim 9, wherein the encoder is further configured to calculate a difference between the number of remaining bits available for coding the remaining pixels of the image and the number of remaining enhancement bits, wherein a number of allocated base bits per block of the first region and a number of allocated base bits per block of the second region correspond to the number of allocated base bits per block, which is based on the difference.

11. The encoder of claim 10, wherein the encoder is further configured to calculate when the current block of the image is in the second region, a total number of allocated bits per block for coding the current block based on a sum of the number of allocated base bits per block of the first region and the second region and the number of enhancement bits per block.

12. The encoder of claim 11, wherein the quantization parameter of the current block is determined based on a quantization parameter of a block coded immediately prior to the current block, a number of bits used to code the block immediately prior to the current block, and a number of bits allocated for the current block, wherein when the current block of the image is in the first region, the number of bits allocated for the current block is the allocated base bits per block for the first region, and when the current block of the image is in the second region, the number of bits allocated for the current block is the total number of allocated bits per block for the second region.

13. A non-transitory computer readable medium implemented on a video data encoder for coding video data, and comprising a memory for buffering the video data, and a processor for controlling the encoder, wherein the medium has stored thereon instructions that, when executed, cause the encoder to:
    identify a first region of an image, a second region of the image, and a third region of the image; and
    allocate a first number of bits comprising base bits for encoding the first region, a second number of bits comprising base bits and enhancement bits for encoding the second region, and a third number of bits comprising base bits and enhancement bits for encoding the third region;
    obtain a number of pixels per block;
    receive current block of the image;
    determine a quantization parameter of the current block based on a previous quantization parameter of a previous block in a region of the current block in a same image frame;
    code the current block with the quantization parameter;
    update a number of remaining pixels of the image to be coded;
    update a number of remaining bits for coding the remaining pixels; and
    determine a number of allocated base bits per block for a number of remaining blocks based on the number of remaining pixels in the image to be coded, the number of remaining bits available for coding the remaining pixels in the image, and a number of remaining pixels in the second region to be coded, the number of allocated base bits per block being the same for every remaining block,
    wherein the second region is encoded with a greater number of bits per pixel than the first region,
    wherein the third region is encoded with a greater number of bits per pixel than the first region, and is encoded with a fewer number of bits per pixel than the second region, and
    wherein the third region surrounds the first region, and is surrounded by the second region.

14. The encoder of claim 13, wherein the instructions, when executed by the processor, further cause the encoder to identify a third region of the image,
    wherein the third region is encoded with a greater number of bits per pixel than the first region, and is encoded with a fewer number of bits per pixel than the second region.

15. The method of claim 1, further comprising adjusting the quantization parameter or a bitrate corresponding to the image based on a level of a buffer for buffering the video data after coding of the image by the encoder has begun.

* * * * *